US005803747A

United States Patent [19]

Sone et al.

[11] Patent Number: 5,803,747

[45] Date of Patent: Sep. 8, 1998

[54] KARAOKE APPARATUS AND METHOD FOR DISPLAYING MIXTURE OF LYRIC WORDS AND BACKGROUND SCENE IN FADE-IN AND FADE-OUT MANNER

[75] Inventors: Takurou Sone; Keizyu Anada; Shingo Kamiya; Hirokazu Kato, all of Hamamatsu, Japan

[73] Assignee: Yamaha Corporation, Hamamatsu, Japan

[21] Appl. No.: 423,369

[22] Filed: Apr. 18, 1995

[30] Foreign Application Priority Data

Apr. 18, 1994 [JP] Japan .................................. 6-103362

[51] Int. Cl.[6] .............................. G09B 5/00; G09B 15/04

[52] U.S. Cl. ................................ 434/307 A; 434/307 A; 434/365; 84/609; 84/634; 386/105; 360/72.2; 348/589

[58] Field of Search ................................ 434/307 R–309, 434/318, 365; 84/477 R, 609–613, 601–604, 634–637, 644, 650–652, 662; 369/1, 4; 360/32, 72.2; 348/473, 595, 723, 589; 358/335, 342; 379/93; 345/136; 386/69, 105, 106

[56] References Cited

U.S. PATENT DOCUMENTS

| | | | |
|---|---|---|---|
| 4,644,400 | 2/1987 | Kouyama et al. | 348/595 X |
| 4,668,989 | 5/1987 | Mackereth | 348/595 X |
| 4,995,026 | 2/1991 | Makabe et al. | 369/70 |
| 5,099,337 | 3/1992 | Cury | 386/54 |
| 5,208,679 | 5/1993 | Yamauchi et al. | 358/342 |
| 5,282,037 | 1/1994 | Eguchi et al. | 348/595 |
| 5,410,097 | 4/1995 | Kato et al. | 84/610 |
| 5,426,516 | 6/1995 | Furuki et al. | 358/500 |
| 5,430,496 | 7/1995 | Silverbrook | 348/589 |
| 5,454,723 | 10/1995 | Horii | 434/370 R X |
| 5,568,167 | 10/1996 | Galbi et al. | 348/589 |
| 5,655,051 | 8/1997 | Furuta et al. | 386/105 |

*Primary Examiner*—Joe Cheng
*Attorney, Agent, or Firm*—Pillsbury Madison & Sutro LLP

[57] ABSTRACT

A karaoke apparatus has an information source for providing a performance data containing musical tone designation information, lyric indication information and fading control information according to progression of a karaoke song in response to a request. A tone generator operates according to the musical tone designation information for generating musical tones of the karaoke song. A first signal generator operates according to the lyric indication information for generating a lyric image signal indicative of lyric words of the karaoke song. A second signal generator generates a background image signal representative of a background scene of the karaoke song. A video superimposer operates according to the fading control information for mixing the lyric image signal and the background image signal with each other to synthesize a composite image signal such that a mixing ratio of the lyric image signal and the background image signal is time-variably controlled according to the fading control information during the course of the progression of the karaoke song. A display device operates according to the composite image signal for displaying a mixture of the lyric words and the background scene in either of fade-in and fade-out manners relative to each other during the course of the progression of the karaoke song.

10 Claims, 4 Drawing Sheets

KARAOKE APPARATUS AND METHOD FOR DISPLAYING MIXTURE OF LYRIC WORDS AND BACKGROUND SCENE IN FADE-IN AND FADE-OUT MANNER

BACKGROUND OF THE INVENTION

The present invention relates to a karaoke apparatus for performing a karaoke song in response to a request while displaying a background scene and lyric words of the requested karaoke song in superposed relation to each other. More specifically, the invention relates to the karaoke apparatus of the type for time-variably controlling a mixing ratio of the background scene and the lyric words according to a fading control signal provided according to progression of the performed karaoke song so as to realize fade-in and fade-out effects in synchronization with changes of the displayed lyric words.

A conventional karaoke performance apparatus is equipped with an image synthesis unit and a display unit as shown in FIG. 6. The image synthesis unit 1 is comprised of a video superimposer for mixing a background image signal Va and a lyric image signal Vb with each other to form a composite image signal Vs. The display unit 2 is comprised of a CRT or something else for receiving the composite image signal Vs to display a mixture of a background scene represented by the background image signal Va and lyric words represented by the lyric image signal Vb on a screen S of the CRT as exemplified by FIG. 5.

According to the prior art as mentioned above, the lyric words suddenly appear on the screen S at a start of performance of the karaoke song. After a color tone of the displayed lyric words is changed during the progression of the performance, the displayed lyric words suddenly disappear from the screen S. Such a display manner would cause an uneasiness and would hinder visibility of the displayed lyric words.

SUMMARY OF THE INVENTION

An object of the invention is to provide a new karaoke apparatus which can realize fade-in and fade-out effects in synchronization with a change of lyric words on a screen. According to the invention, a karaoke apparatus comprises information source means for providing a performance data containing musical tone designation information, lyric indication information and fading control information according to progression of a karaoke song in response to a request, performance means operative according to the musical tone designation information for generating musical tones of the karaoke song, first signal generating means operative according to the lyric indication information for generating a lyric image signal indicative of lyric words of the karaoke song, second signal generating means for generating a background image signal representative of a background scene of the karaoke song, image synthesis means operative according to the fading control information for mixing the lyric image signal and the background image signal with each other to synthesize a composite image signal such that a mixing ratio of the lyric image signal and the background image signal is time-variably controlled according to the fading control information during the course of the progression of the karaoke song, and display means operative according to the composite image signal for displaying a mixture of the lyric words and the background scene in either of fade-in and fade-out manners relative to each other during the course of the progression of the karaoke song.

In such a construction of the inventive karaoke apparatus, the mixing ratio of the background image signal and the lyric image signal is time-variably or time-dependently controlled according to the fading control information provided sequentially along the progression of the karaoke song. For example, a weight of the lyric image signal is gradually increased relative to that of the background image signal so that the lyric words gradually appear on the screen in the fade-in manner. In turn, the mixing weight of the lyric image signal may be gradually decreased so that the displayed lyric words fade out from the screen.

DETAILED DESCRIPTION OF THE INVENTION

Figure 1:
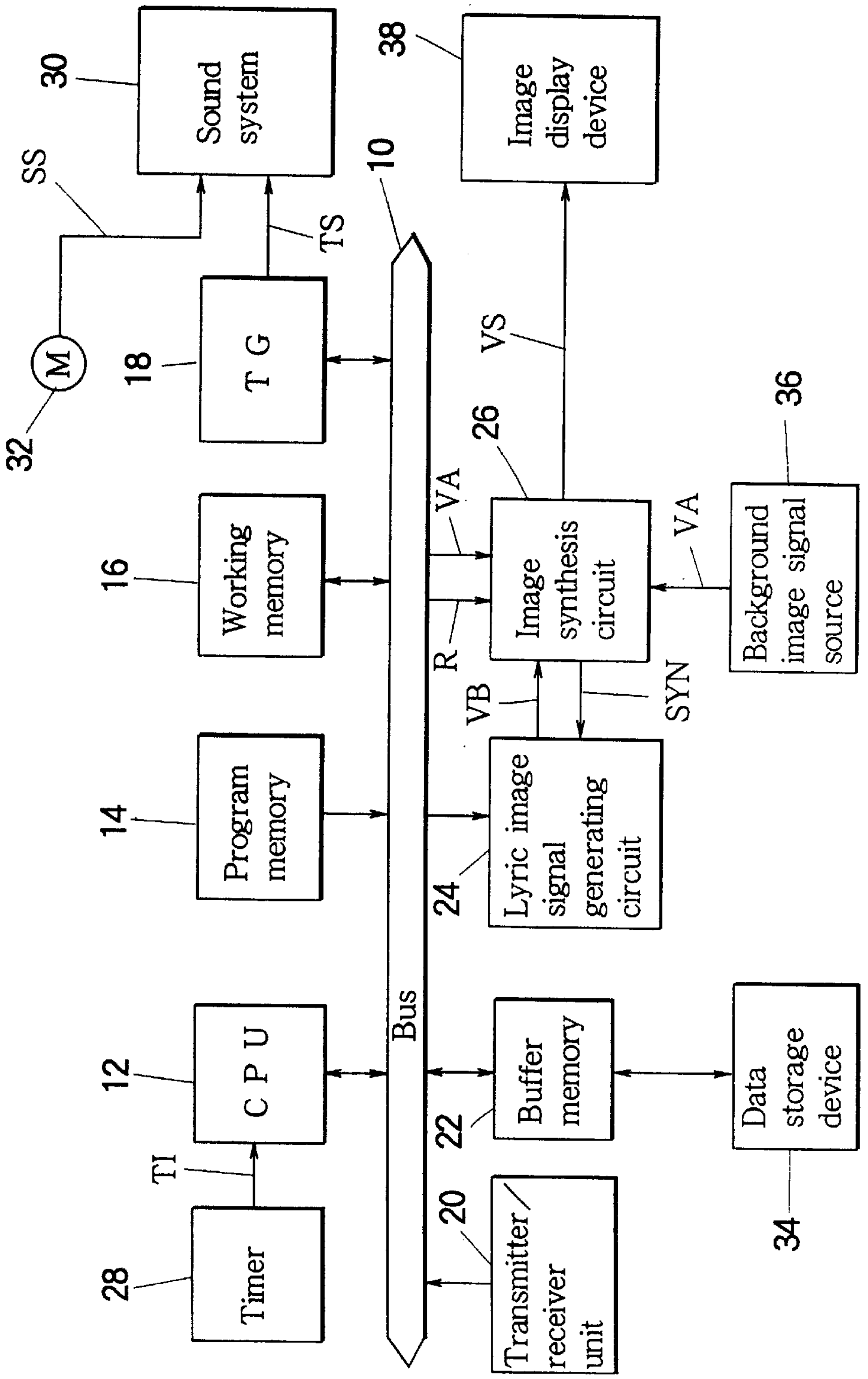
FIG. 1 is a block diagram showing a circuit construction of one embodiment of the inventive karaoke apparatus.

FIG. 1 shows a circuit construction of one embodiment of the inventive karaoke apparatus which utilizes a microcomputer to control musical tone generation of a karaoke performance and display of a background scene. The apparatus has a bus 10 which connects altogether a central processing unit (CPU) 12, a program memory 14, a working memory 16, a tone generator (TG) 18, a transmitter/receiver unit 20, a buffer memory 22, a lyric image signal generating circuit 24, an image synthesis circuit 26 and so on.

The CPU 12 executes various processes including the musical tone generation and the picture display according to a program stored in the memory 14. The CPU 12 receives an interrupt signal TI from a timer 28. The CPU 12 counts the interrupt signal TI to measure a relative time interval between adjacent events involved in the karaoke performance so as to successively retrieve an event data from the buffer memory 22. The working memory 16 is composed of a random access memory (RAM) which contains a memory area utilized as registers and counters during the various processes by the CPU 12.

The tone generator 18 includes a plurality of musical tone generating channels for producing an orchestral accompaniment of the karaoke performance. A sound system 30 including an amplifier and a loudspeaker receives musical tone signals TS from the respective musical tone generating channels to convert the signals TS into a musical sound of the karaoke song. A microphone (M) 32 is connected to the sound system 30. The microphone 32 picks up a live voice of a karaoke player along the orchestral accompaniment to produce a singing voice signal SS. The sound system 30 mixes the singing voice signal SS with the musical tone signal TS from the TG 18 to form the mixed sounds.

The transmitter/receiver unit 20 is provided to communicate with a karaoke database through a telecommunication network such as a public telephone network, a cable television network (CATV) and an integrated services digital network (ISDN). Upon request of a desired karaoke song from a karaoke player by means of an operation implement (not shown in the figure), the CPU 12 transmits a request message to the karaoke database through the transmitter/receiver unit 20 (communication interface). Then, the CPU 12 receives a performance data of the requested karaoke song from the database through the communication interface, and stores the performance data in the buffer memory 22. In such a case, the CPU 12 may concurrently receive a background image data associated to the requested karaoke song. Further, a data storage device 34 such as a hard disc device is connected to the buffer memory 22, so that the performance data of the buffer memory 22 is transferred to the storage device 34 to reserve the performance data. By such a manner, the storage device 34 stores the performance data and the image data of a plurality of karaoke songs. Therefore, upon a request of a desired karaoke song, the karaoke apparatus may readily retrieve the performance data and the image data of the requested song from the storage device to commence the karaoke performance without accessing the database through the transmitter/receiver unit 20.

Figure 2:
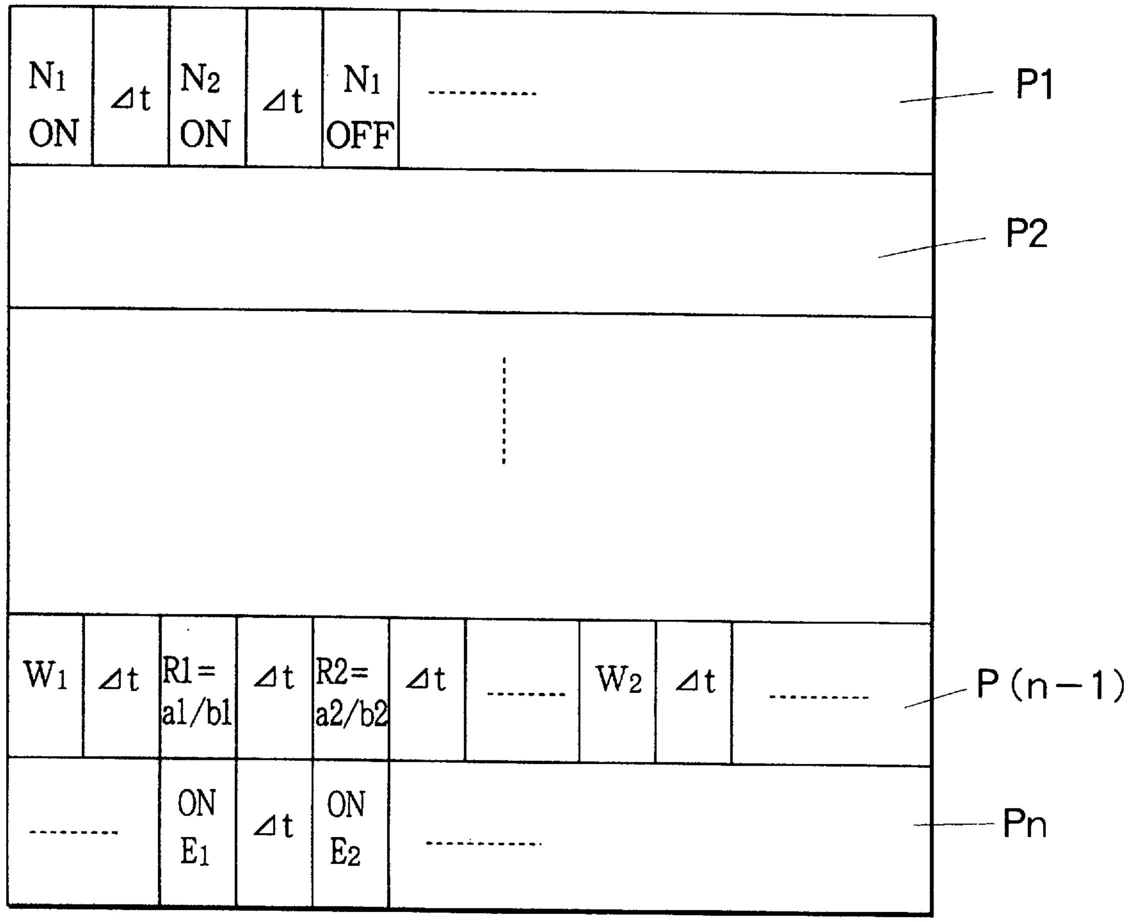
FIG. 2 is a schematic diagram showing a complete data format of one karaoke song.

FIG. 2 shows a performance data format of one karaoke song. The exemplified data format is constructed based on Musical Instrument Digital Interface (MIDI) standard. The performance data of the one karaoke song contains a plurality of parallel tracks or parts $P_1$–$P_n$ (for example, n=16). The first part $P_1$ may be a melody part, the second part $P_2$ may be an accompaniment part, the part $P(_{n-1})$ may be a lyric part, and the last part $P_n$ may be a control part.

The first part $P_1$ contains musical tone designation information composed of an alternate arrangement of an event data which is sequentially arranged in the order of occurrence and a relative time interval data between adjacent events. The event data includes a first on-event data of note $N_1$, a second on-event data of note $N_2$, a third off-event data of note $N_1$, and so on. Each time interval data $\Delta t$ is interposed between adjacent event data to determine a time difference between preceding and succeeding events. The on-event data is comprised of an identification code, a channel code, a tone pitch data and a tone volume data. The off-event data has a modified form of the on-event data where the tone volume data is set to zero.

The part $P(_{n-1})$ contains lyric indication information in the form of a lyric word data and fading control information in the form of a mixing ratio data. Each of word data $W_1$, $W_2$, . . . indicates a phrase of the lyric in the form of a sequence of characters. The first word data $W_1$ represents an initial or top phrase of the song lyric, and the second word data $W_2$ represents another phrase subsequent to the top phrase. A time interval data $\Delta t$ is interposed between a adjacent word data and a mixing ratio data, and between preceding and succeeding mixing ratio data, so as to determine a time interval between corresponding preceding and succeeding events. Then, the alternate arrangement of the time interval data and the mixing ratio data is set between the first and second word data $W_1$ and $W_2$, and is utilized for fading control information effective to control fade-in and/or fade-out of the corresponding lyric phrase.

Figure 3:
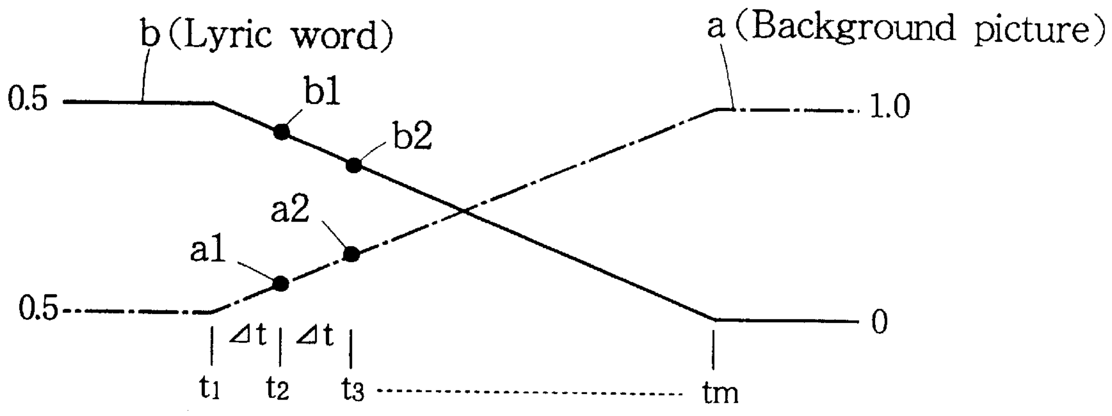
FIG. 3 is a timing chart showing a fading control according to the invention.

FIG. 3 shows one example of fading control. The mixing ratio data is represented by R=a/b where the coefficient a denotes a weight of the background picture and gradually varies from 0.5 to 1.0 during a time period of $t_1$ through $t_m$. The other coefficient b denotes a weight of the lyric word and gradually varies from 0.5 to 1.0 during the same period of $t_1$, through $t_m$. A sum of the coefficients a and b is held constant (a+b=1) throughout the time period of $t_1$ through $t_m$. This period $t_1$–$t_m$ is divided into a plurality of time slots by $t_1$, $t_2$, $t_3$, . . . , $t_m$such that each time slot has the same time interval $\Delta t$ between $t_1$–$t_2$, $t_2$–$t_3$, and so on. Alternatively, the time interval $\Delta t$ may be set differently for the respective time slots.

Referring back to FIG. 2, a time interval data $\Delta t$ preceding to the first mixing ratio data R1 indicates the time slot $t_1$–$t_2$, and another time interval data $\Delta t$ succeeding to the first mixing ratio data R1 indicates the time slot $t_2$–$t_3$. The first mixing ratio data R1 represents a mixing ratio a1/b2 of the background picture and the lyric word at the moment of $t_2$. In similar manner, the second mixing ratio data R2 represents a mixing ratio a2/b2 at the moment of $t_3$.

The last part $P_n$, is provided to control various effects or additional events such as PCM voice event , illumination event and microphone echo event. The last part $P_n$ contains a sequence of a first on-event data $E_1$, an interposed time interval data $\Delta t$, a second on-event data $E_2$ and so on.

In operation, the CPU 12 reads out an event data from each part, and then measures a lapse time by counting the interrupt signal TI. When the lapse time reaches the time interval determined by a time interval data $\Delta t$ next to the read event data, the CPU 12 reads out a next event data. By such a manner, the CPU 12 addresses the memory 22 to read out various event data from the respective parts in parallel manner, which include the note-on and note-off event data, the word data, the mixing ratio data, the effect-on event data and so on. The read note-on and note-off event data are fed to the tone generator 18. The read word data is fed to the lyric image signal generating circuit 24. The read mixing ratio data R is fed to the image synthesis circuit 26. Further, the event-on data is distributed to various additional effect devices according to kinds of the effect events, such as a voice decoder for decoding the PCM voice, a stage illumination controller and a microphone echo controller. The tone generator 18 generates a musical tone signal in response to the note-on event data, and starts damping of the generated musical tone signal in response to the note-off event data.

Concurrently, the memory 22 is addressed to retrieve therefrom a background image data associated to the karaoke song to be presented. The retrieved background image data is supplied in the form of a background image signal VA to the image synthesis circuit 26 composed of the video superimposer. Alternatively, if the background image data is not stored in the memory 22, a background image signal source 36 such as an optical video disc driver is driven to supply the background image signal VA to the image synthesis circuit 26. The image synthesis circuit 26 has a sync signal separating circuit which separates a sync signal SYN from the inputted background image signal (video signal) VA and which feeds the sync signal SYN to the word lyric signal generating circuit 24.

The lyric image signal generating circuit 24 operates according to the lyric word data (character code data) from the memory 22 for forming a lyric image signal VB. The circuit 24 feeds the lyric image signal VB timed by the sync signal SYN to the image synthesis circuit 26. For example, the lyric image signal generating circuit 24 contains an image read-only memory (ROM) and a video RAM. The lyric word data is converted into an initial lyric image signal representative of a character pattern by means of the image ROM. The initial lyric image signal is once written into the video RAM, which is then addressed to read out the video signal VB of the word image. The lyric image signal VB is fed to the image synthesis circuit 26.

The image synthesis circuit 26 mixes the background image signal VA and the lyric image signal VB with each other by a time-varying mixing ratio which is determined by the sequence of the mixing ratio data R1, R2, . . . , from the memory 22. For example, in case that the pair of the weight parameters a and b are set as shown in FIG. 3, the image signals VA and VB are mixed with each other to synthesize a composite image signal VS according to an equation VS=a×VA+b×VB. The composite image signal VS is fed from the image synthesis circuit 26 to an image display device 88 such as CRT. Consequently, the display device 38 displays a mixture of the background picture and the lyric words superimposed to the background picture on a screen. Before a currently displayed section or phrase of the song lyric is changed to a next section or phrase, the fading control is conducted according to the equation VS=a×VA+b×VB using the mixing ratio data so that the currently displayed phrase fades out. In such a case, the sum of the weight parameters is kept constant as a+b=1 so that a total brightness of the screen is held constant.

Figure 4:
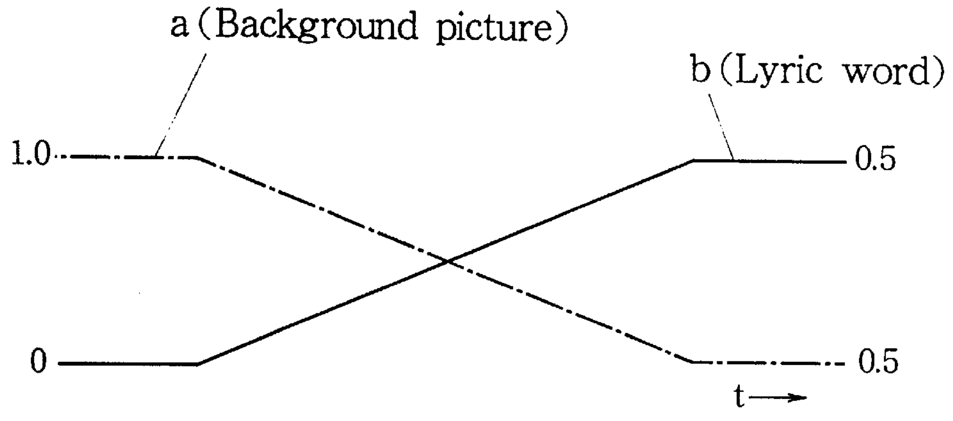
FIG. 4 is a timing chart showing another fading control according to the invention.
Figure 5:
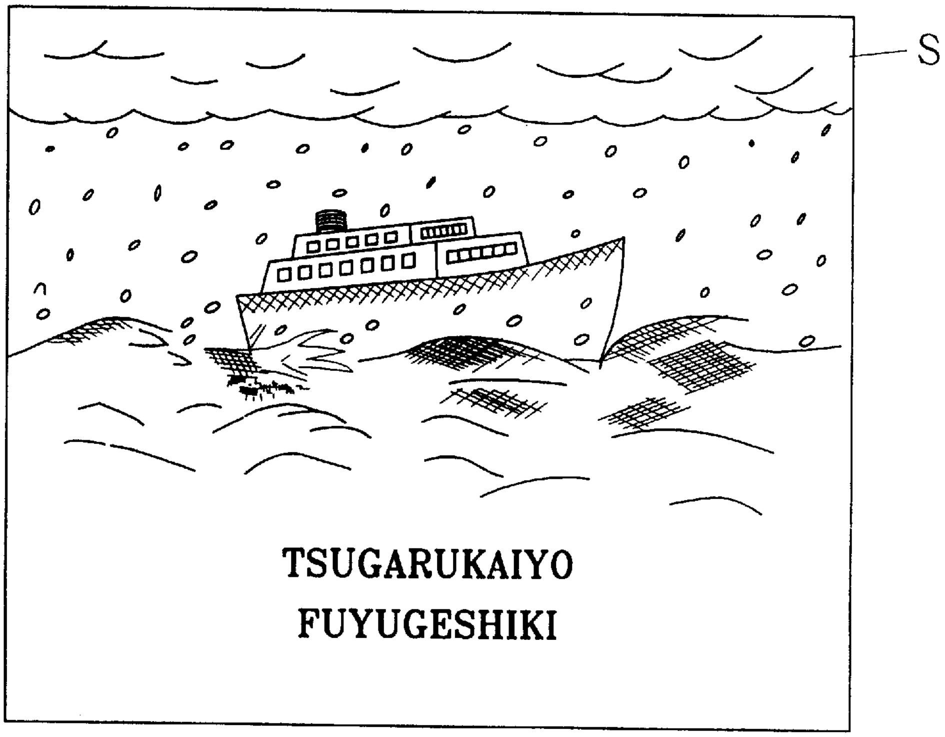
FIG.5 PRIOR ART
FIG. 5 is an exemplified view of a display screen of a conventional karaoke apparatus.
Figure 6:
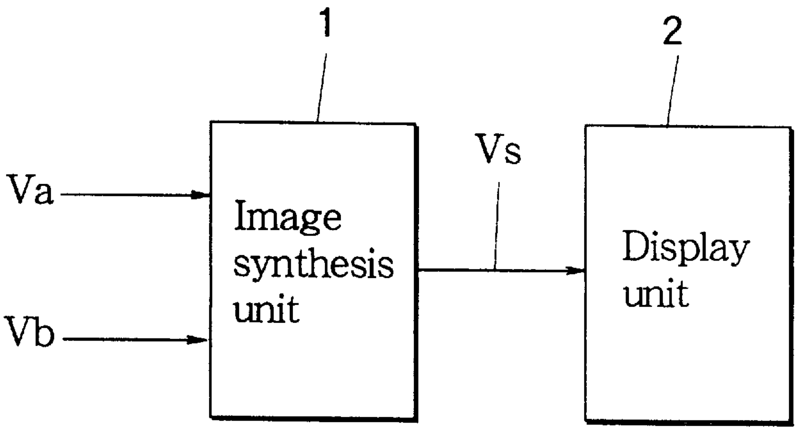
FIG.6 PRIOR ART
FIG. 6 is a block diagram of a conventional karaoke apparatus.

In the above described embodiment , the fade-out control is effected at the end of the current phrase of the lyric words. In modification, fade-in control may be conducted when an old phrase is switched to a new phrase. For example, as shown in FIG. 4, a sequence of time-varying mixing ratio control data is arranged subsequently to the new word data. The weight coefficient a and b are set as shown in FIG. 4. The image synthesis is executed according to the equation VS=a×VA+b×VB. In the time chart of FIG. 4, t denotes a lapse time. The weight coefficient of the background scene or picture is set to gradually fall from 1.0 to 0.5, while the other weight coefficient of the lyric words is set to gradually rise from 0 to 0.5.

The present invention is not limited to the disclosed embodiments, but may include various modifications as follows. The inventive karaoke apparatus is applied not only to the online type as disclosed above, but also to a stand-alone type. For example, the data storage device 34 may store CD-ROMs which record a vast number of karaoke song data. A particular performance data of a desired karaoke song can be readily transferred from the CD-ROM to the buffer memory 22 so as to effect the karaoke performance. In such a case, the background image data associated to the karaoke song can be processed concurrently with the corresponding performance data.

The mixing ratio data may not be written into the word part together with the word data, but may be written into another part together with other data, or may be recorded into a separate part. Further, a first data indicative of a constant mixing ratio and a second data indicative of a time period in which the fading control is completed are coupled to each other to form a data set. A plurality of the data sets are sequentially arranged and recorded throughout the song. In such a case, the first data is interpolated to sequentially provide a time-varying mixing ratio data along a time lapse within the time period set by the second data.

The lyric word image subjected to the fading control may include not only the word character, but also a graphic title picture, an animation and a static picture.

As described above, according to the invention, the fade-in and fade-out effect can be obtained in synchronization with sequential display and erase of the lyric words, thereby providing a well visible screen without need for panel operation or else to efficiently assist in live vocal performance. Further, the mixing ratio and the time-variation of the fade-in and fade-out are set optimumly for an individual karaoke song, thereby realizing the adequate fading effect which is arranged in conformity with the individual karaoke song.

What is claimed is:

1. A karaoke apparatus comprising:

information source means for providing a performance data containing musical tone designation information, lyric indication information and fading control information according to progression of a karaoke song in response to a request;

performance means operative according to the musical tone designation information for generating musical tones of the karaoke song;

first signal generating means operative according to the lyric indication information for generating a lyric image signal indicative of lyric words of the karaoke song;

second signal generating means for generating a background image signal representative of a background scene of the karaoke song;

image synthesis means operative according to the fading control information for mixing the lyric image signal and the background image signal with each other to synthesize a composite image signal such that a mixing ratio of the lyric image signal and the background image signal is time-variably controlled according to the fading control information during the course of the progression of the karaoke song; and display means operative according to the composite image signal for displaying a mixture of the lyric words and the background scene in either of fade-in and fade-out manners relative to each other during the course of the progression of the karaoke song.

2. A karaoke apparatus according to claim 1, wherein the second signal generating means comprises means for accessing the information source means to retrieve therefrom background scene information which is contained in the performance data and for processing the background scene information to generate a corresponding background image signal.

3. A karaoke apparatus according to claim 1, wherein the image synthesis means comprises means operative before an old section of the lyric words is changed to a new section of the lyric words for mixing the lyric image signal to the background image signal by a decreasing mixing ratio so that the old section of the lyric words fades out from the background scene.

4. A karaoke apparatus according to claim 1, wherein the image synthesis means comprises means operative after an old section of the lyric words is changed to a new section of the lyric words for mixing the lyric image signal to the background image signal by an increasing mixing ratio so that the new section of the lyric words fades in over the background scene.

5. A karaoke apparatus according to claim 1, wherein the information source means comprises means for providing a first track containing a sequence of the musical tone designation information, and for providing a second track in parallel to the first track, the second track containing a sequence of the lyric indication information and the fading control information linked to the lyric indication information.

6. A karaoke apparatus according to claim 1, wherein the information source means includes means for providing the fading control information effective to maintain a total brightness of the displayed mixture of the lyric words and the background scene, and effective to time-vary respective brightnesses of the lyric words and the background scene complementarily with each other.

7. A karaoke apparatus according to claim 1, wherein the information source means comprises means for providing a first track of information containing a sequence of the musical tone designation information, and a second track of information in parallel with the first track, the second track containing a sequence of the lyric indication informing corresponding to phrases of lyric words, a sequence of the fading control information, and duration control information operable to control a display duration of each phrase of lyric words.

8. A method of operating a karaoke apparatus, comprising the steps of:

providing a performance data containing musical tone designation information, lyric indication information and fading control information according to progression of a karaoke song in response to a request;

generating musical tones of the karaoke song according to the musical tone designation information;

generating a lyric image signal indicative of lyric words of the karaoke song according to the lyric indication information;

generating a background image signal representative of a background scene of the karaoke song;

mixing the lyric image signal and the background image signal with each other according to the fading control information to synthesize a composite image signal such that a mixing ratio of the lyric image signal and the background image signal is time-variably controlled according to the fading control information during the course of the progression of the karaoke song; and displaying a mixture of the lyric words and the background scene according to the composite image signal in either of fade-in and fade-out manners relative to each other during the course of the progression of the karaoke song.

9. An apparatus for processing performance data, the apparatus comprising:

a memory containing musical tone designation information, lyric indication information and fading control information R according to the progression of a performance;

a sound system operative in accordance with the musical tone designation information;

a lyric image signal generating circuit operative in accordance with the lyric indication information to generate a lyric image signal VB;

a background image signal source operative to provide a background image signal representative of a background scene VA;

an image synthesis circuit operative according to the fading control information for mixing the lyric image signal and the background image signal with each other to form a composite image signal VS;

wherein $VS=a\times VA+b\times VB$, where a and b are brightness weight values and wherein the fading control information $R=a/b$.

10. An apparatus as recited in claim 9, wherein the sum of $a+b$ is a constant.

* * * * *